May 31, 1955     R. H. THIELEMANN     2,709,568
WELDED TURBINE DISC WITH BLADES
Filed May 26, 1948
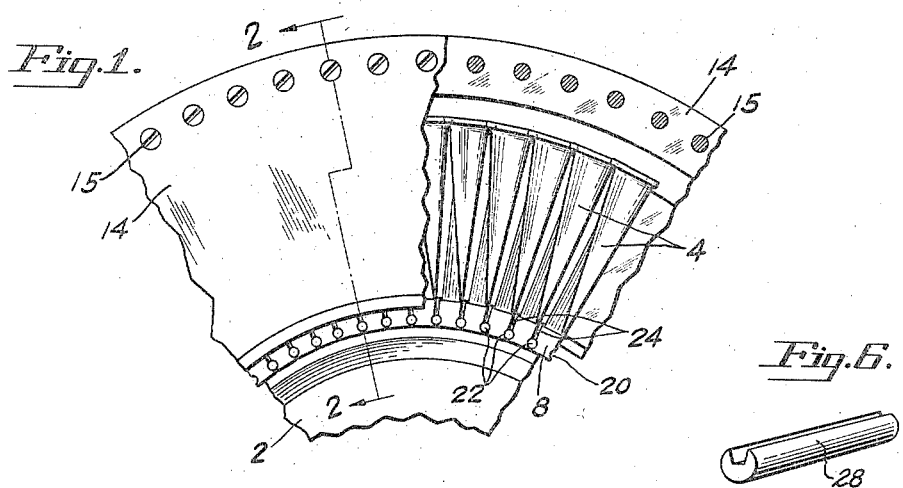
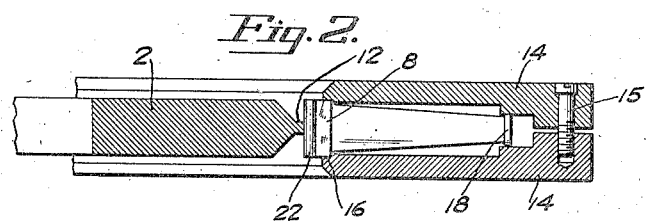
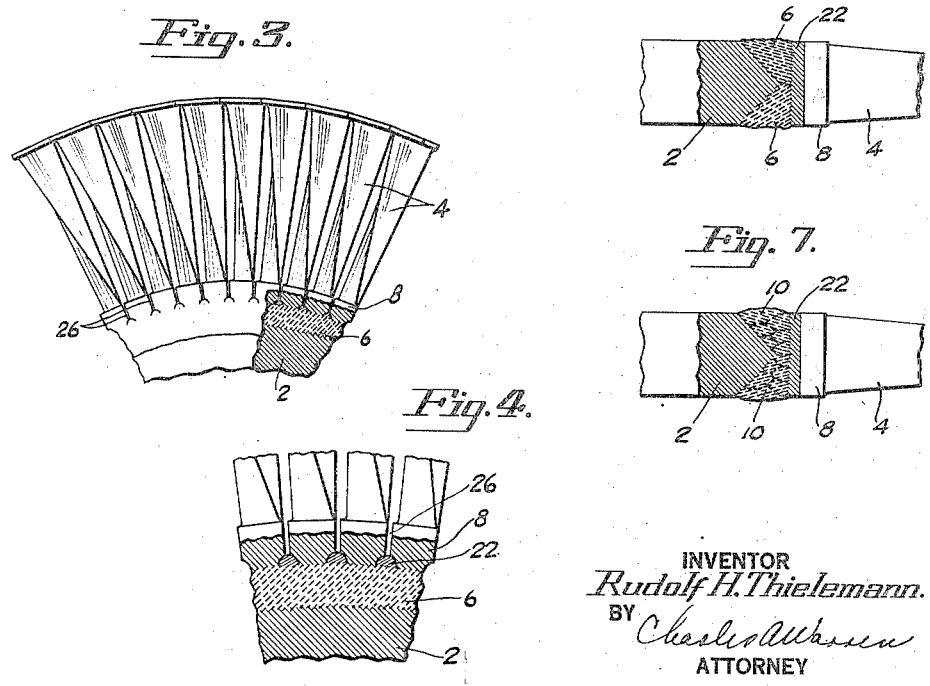
INVENTOR
Rudolf H. Thielemann.
BY
ATTORNEY

United States Patent Office 2,709,568
Patented May 31, 1955

2,709,568

WELDED TURBINE DISC WITH BLADES

Rudolf H. Thielemann, East Hampton, Conn., assignor to United Aircraft Corporation, East Hartford, Conn., a corporation of Delaware Application May 26, 1948, Serial No. 29,363

3 Claims. (Cl. 253—77)

This invention relates to turbine rotors and particularly to welded turbine discs for the rotors.

In the production of turbine discs for applications where lightness in weight is important, the welded blade fastening is obviously desirable. The turbine blades, or buckets, are arranged in an annular row around the circumference of the turbine hub, and a suitable weld preparation between the blade roots and the turbine hub is provided. This preparation may take the form of an annular groove on each side of the disc; depositing weld metal in the annular groove on each side of the wheel welds the roots of the blades to the hub. The disc is finished by machining off the excess weld metal so that a smooth, continuous weld metal joint is realized.

In order to keep the blades from bunching and gathering during welding, it has been necessary to fit the blades tightly in the welding fixtures so that there is no clearance between adjacent blade roots or bases. The existing notch or discontinuity of material between adjacent blade roots forms, in effect, a radial crack in the rim of the disc. During cooling of the disc or rotor, stresses are set up in the rim which tend to enlarge these discontinuities between adjacent blades. Continued operation of the wheel may cause these cracks to extend radially inwards, thereby weakening the rim strength of the disc. The use of a drilled hole to stop such a crack from progressing is well known, but in turbine rotors operating at extremely high temperatures, the metal of the blades and hub is frequently extremely difficult to machine and the drilling of small holes is impractical. Operational experience has clearly indicated that such a drilled hole will not always stop the cracking from progressing and that the reason for the cracking is due to more fundamental considerations.

In welding discs of this type, it has been observed that as the deposited weld metal is cooling and contracting, the blade roots are heating and hence, expanding. With no clearance between adjacent blade roots, the circumferential expansion of the blade roots is limited. It follows that very high stresses will be developed between the adjacent blades, resulting in the formation of small radial crack extensions into the weld metal.

This same stress condition is known to exist when a gas turbine is started, since during starting the blades are heated, and hence, expanding, much faster than the hub. Sufficient stresses may be developed to cause the radial crack extensions to propagate inwards. It has been found that these difficulties can be readily overcome by providing small gaps between the adjacent blade bases prior to welding. A feature of this invention is an arrangement for providing tightly fitting soft metal inserts between adjacent blade roots at the periphery of the weld metal so that the required spacing between adjacent blades will be maintained during and after welding.

A feature of the invention is the use of the soft metal inserts in providing a metal dam to limit the flow of weld metal between adjacent blade roots. Another feature of the invention is the insertion of the soft metal inserts at a highly stressed section which will have high hot ductility to resist the strains which are developed during welding, heating, and cooling. By judicious selection of materials, the soft metal insert can be of a composition that will improve weldability and provide metallurgical compatability with the turbine blades and the deposited weld metal.

In addition to providing a space between the blade roots to prevent cracking during welding and to prevent the development of excessive circumferential stresses on the roots during cooling of the disc after welding, it has been found advantageous to make this slot wider so that the surfaces of adjacent blade roots will not engage each other during operation of the turbine. It will be understood that in starting a turbine the blades and blade roots become extremely hot while the hub itself is relatively cool, and the differential thermal expansion would create severe stresses circumferentially if the blade roots were closely spaced. A feature of the invention is the use of the metallic pins for spacing the blade roots prior to welding and for maintaining the desired spacing between the blade roots during and subsequent to the welding operation.

Other objects and advantages will be apparent from the specification and claims, and from the accompanying drawings which illustrate an embodiment of the invention.

Fig. 1 is a fragmentary plan view of a row of turbine blades together with a supporting structure for the blades in readiness for the welding operation by which the blades will be attached to the hub.

Fig. 2 is a sectional view substantially on line 2—2 of Fig. 1.

Fig. 3 is a fragmentary plan view of the turbine disc after the welding operation.

Fig. 4 is a fragmentary view on a larger scale of the welded joint of Fig. 3.

Fig. 5 is a fragmentary sectional view at right angles to Fig. 4 showing the welding process.

Fig. 6 is a perspective view of a modified type of pin for the disc.

Fig. 7 is a fragmentary sectional view similar to Fig. 5 showing a variation in the welding process.

In the completed turbine disc, as shown in Fig. 3, the hub 2 has a row of blades 4 secured to its periphery by circumferential welds 6 which attach the roots 8 of the blades permanently to the hub and form an unitary disc. The welds 6, as shown in Fig. 5, consist in general of two separate welding processes, one of which is performed on each side of the disc to minimize the distortion resulting from the welding of the blades to the hub.

It will be understood that, instead of a single welding operation on each side of the disc, the welding may be accomplished by a number of separate annular welds 10, each formed by one pass of the welding rod, as indicated in Fig. 7. The welds 10 are preferably applied alternately to opposite sides of the disc until the desired amount of weld metal has been deposited. It has been found that multiple-pass welding of this type minimizes the tendency of the weld to distort the blades from their proper relation to the central plane of the disc.

In the arrangement shown, the hub 2 may have a peripherical projecting tongue 12, as in Fig. 2, in a position to engage with the inner surfaces of the blade roots 8 thereby accurately positioning the hub within the ring of blades prior to the welding operation. The blades are assembled and held in a ring adapted to fit around the hub and may be clamped in position by opposed clamping plates 14 held together as by bolts 15. The plates normally engage the blade roots, as by the shoulders 16 on the inner surfaces of the plates which determine the radial spacing of the blade from the axis. The plates also clamp the shroud 18 to maintain the desired axial and radial location of the blades. The shrouds of adjoining blades are preferably of such a size that they are in contact with one another and control the circumferential spacing of the tips of the blades.

For the purpose of assuring a tight fit of the blades in the clamping structure, the opposed side surfaces of the blade roots 8 are provided with notches or grooves 20, the notches or grooves of adjacent blade roots forming axially extending passages between adjacent blades. These passages which are preferably substantially cylindrical receive metallic inserts in the form of ductile metal pins 22. The pins, as shown in Fig. 2, extend the entire axial length of the roots and are so dimensioned that they will space the adjacent blade roots apart a predetermined amount as indicated by the spaces 24, Fig. 1. In the particular arrangement shown, a spacing of between .005 and .020 inch has been found advantageous to keep the adjacent roots spaced apart in all conditions of the disc. These pins have an additional function in that they form a dam to limit the extent of the flow of the welding metal between the blade roots. Thus, as best shown in Figs. 4 and 5, the welding process has melted the material of the blade root up to a point approximately half way through the ductile pins so that each pin becomes an integral part of the weld. In the arrangement shown, the pins used are annealed steel pins having 18% chromium, 8% nickel, and the balance iron, although other types of ductile materials may be used. The outer periphery of the weld joint is substantially a circle concentric to the disc axis and substantially including the axial centerlines of the pins.

During the cooling of the welded disc, the contraction of the hub and blade roots and also the weld material causes a decrease in the diameter of the finished disc thereby bringing the opposed side surfaces of the blade roots closer together as represented by the notches 26, Fig. 3. The pins 22 are sufficiently ductile to permit the blade roots to move circumferentially toward each other without causing the formation of radial cracks extending through the weld and without setting up severe tensile stresses in the weld that would encourage the formation of the radial cracks. The pins provide a uniform spacing of the blade roots prior to the welding operation and also assure a similar but smaller spacing of the blade roots subsequent to the welding operation.

Instead of a cylindrical pin 22 as hereinbefore described, the pin may have a different cross-sectional contour, as, for example, the grooved pin 28 of Fig. 6. This groove provides a space for the ductile material of the pin to flow into without being extruded out the ends of the passages formed by the grooves 20.

It is to be understood that the invention is not limited to the specific embodiment herein illustrated and described, but may be used in other ways without departure from its spirit as defined by the following claims.

I claim:

1. A welded turbine disc having a hub, blades extending from the hub at the periphery thereof, each of said blades having a root welded to the periphery of the hub, adjacent blade roots having grooves thereon forming axially extending passages through the disc, ductile inserts in said passages, the circumferential dimension of said root radially outward of said groove being less than the circumferential dimension of the space for said root, said inserts being secured in said passages by the same welded joint that holds the blade roots to the hub, each of said inserts being slotted along the outer surface thereof.

2. A welded turbine disc having a hub, blades extending from the hub at the periphery thereof, each of said blades having a root welded to the periphery of the hub, adjacent blade roots having grooves thereon forming axially extending passages through the disc, ductile pins in said passages, the circumferential dimension of said root radially outward of said groove being less than the circumferential dimension of the space for said root, said pins being secured in said passages by the same welded joint that holds the blade roots to the hub, each of said pins having a longitudinal slot therein for substantially the entire length of the pin.

3. A turbine disc having a hub, blades extending radially from said hub at the periphery thereof, each blade having a root from which the blade projects, a weld joint extending around the periphery of the hub between the roots and the hub and integrally connecting the roots and the hub, and ductile metallic pins extending axially of the disc between adjacent blade roots at the outer periphery of the weld joint, said roots having axially extending notches to receive the pins, the notches being less deep than the radius of the pins such that the blade roots are spaced apart, the weld joint extending radially outward to a circle substantially concentric to the disc axis and substantially including the axial centerlines of the pins such that the pins are only partially included in the weld joint, the spacing of the blade roots by the pins being such that the opposite surfaces of adjacent roots will be spaced apart in all conditions of the disc.

References Cited in the file of this patent

UNITED STATES PATENTS

| | | |
|---|---|---|
| 2,256,924 | Hopkins | Sept. 23, 1941 |
| 2,380,276 | Warren | July 10, 1945 |
| 2,384,919 | Huber | Sept. 8, 1945 |
| 2,405,146 | Huber | Aug. 6, 1946 |
| 2,450,493 | Strub | Oct. 5, 1948 |